United States Patent [19]

Sato et al.

[11] Patent Number: 4,704,704
[45] Date of Patent: Nov. 3, 1987

[54] PROGRAMMABLE CONTROLLER AND METHOD

[75] Inventors: Yusho Sato; Koji Koizumi, both of Kanasacki, Japan

[73] Assignee: Fuji Electric Company, Ltd., Kanagawa, Japan

[21] Appl. No.: 685,303

[22] Filed: Dec. 24, 1984

[30] Foreign Application Priority Data

Dec. 26, 1983 [JP] Japan .................... 58-244126

[51] Int. Cl.⁴ .................... G06F 9/06; G06F 15/46
[52] U.S. Cl. .................................... 364/900
[58] Field of Search ... 364/200 MS File, 900 MS File

[56] References Cited

U.S. PATENT DOCUMENTS 3,701,113 10/1972 Chace et al. .................... 364/200
3,978,454 8/1976 Willard ........................... 364/900
4,070,702 1/1978 Grants et al. ................... 364/900
4,166,290 8/1979 Furtman et al. ................ 364/200
4,249,248 2/1981 Yomogida et al. .............. 364/900
4,504,900 3/1985 Yomogida et al. .............. 364/900

Primary Examiner—Gareth D. Shaw
Assistant Examiner—Kevin A. Kriess
Attorney, Agent, or Firm—Finnegan, Henderson, Farabow, Garrett and Dunner

[57] ABSTRACT

A programmable controller employing an address table to locate a plurality of execution programs for executing corresponding instructions, in which an address of an execution program is replaced in that table with the address of a corresponding execution/monitor program whenever the execution result of that execution program is to be monitored.

2 Claims, 7 Drawing Figures

PROGRAMMABLE CONTROLLER AND METHOD

BACKGROUND OF THE INVENTION

1. Field of the Invention

The present invention generally relates to a programmable controller and method for executing a sequence program having a plurality of program steps, and particularly to a programmable controller and method in which the result of a selected sequence instruction executed within one of those program steps can be monitored.

2. Description of the Prior Art

In a conventional programmable controller of the kind described above, the processing for executing the sequence instruction of each program step making up a sequence program, the processing for storing the execution result of such instructions in an instruction execution result memory, and the processing for managing an index of the execution results stored in the instruction execution result memory are all performed by a sequence instruction execution/monitoring program. The results of such execution of sequence instructions are always stored in a location within the instruction execution result memory corresponding to the respective program step in which the sequence instructions were located. Thus, in a programmable controller of this kind, if a monitor request existed for a particular program step, the contents of the instruction execution result memory corresponding to that program step are displayed to monitor the sequence instruction execution results for that program step.

FIG. 1 shows a conventional programmable controller arranged as described above. In FIG. 1, there are provided a Central Processing Unit (CPU) 1, a sequence instruction execution/monitor program memory 2, a system program memory 3, an instruction execution result memory 4 (hereinafter, simply referred to as a "result memory"), a monitor request flag memory 6, an instruction execution result storage index memory 7 (hereinafter, simply referred to as an "index memory"), a monitor step memory 8, a display section 9, and a data bus 10. The CPU 1 is in the form of, for example, a microprocessor for controlling the respective memory sections described above and for executing a sequence program stored in system program memory 3. The sequence instruction execution/monitor program memory 2 stores, for each sequence instruction, a sequence instruction execution/monitor program for executing the corresponding sequence instruction in CPU 1 and for performing processing for storing the result of the execution of that sequence instruction in result memory 4.

System program memory 3 stores a program for controlling the whole programmable controller, including the sequence program. Result memory 4 stores execution results of the respective program steps of the sequence program in locations corresponding to each step. Table memory 5 stores the head address and operand information of each sequence instruction execution/monitor program to be started for each of the steps of the sequence program, and stores for each such program an escape address to be used after execution of the final instruction of that sequence instruction execution/monitor program. Monitor request flag memory 6 stores a flag for designating the existence of a monitor request. Index memory 7 stores an index for designating the positions in the sequence program where each sequence instruction is performed and where the results of each sequence instruction is stored in result memory 4. Monitor step memory 8 stores the step number of the sequence program for which a monitor request exists. Display section 9 displays the state of the sequence instruction execution result. The respective sections described above are connected to each other through data bus 10.

FIG. 2 shows the processing procedure executed by one sequence instruction execution/monitor program stored in the sequence instruction execution/monitor program memory 2 shown in FIG. 1. The CPU processing for executing a sequence instruction is performed in a first step S2-1, and the result of the execution of the sequence instruction (hereinafter, simply referred to as the "execution result") is stored by the processing of second step S2-2 into result memory 4 at a location or position thereof designated by the contents of index memory 7. In a third step S2-3, the contents of index memory 7 are stepped to designate where in result memory 4 the execution result of the next sequence instruction will be stored. Then in a fourth step S2-4, the next sequence instruction execution/monitor program is started, terminating the processing of the preceding sequence instruction execution/monitor program.

This program is started every time one step of the sequence program is executed until all the steps (that is, one scanning) constituting the sequence program are processed.

FIG. 3 shows the relation between a flowchart for processing one scanning of a sequence program and the contents of the result memory 4 for the programmable controller of FIG. 1. If execution of a sequence program is started, the sequence instruction execution/monitor program of the first step is started at step S3-1 of FIG. 3(A), and the execution result is stored, as shown in FIG. 3(B), in the result memory 4 in the region of memory 4 indicated by index memory 7 as corresponding to the first step of the sequence program. Next, in step S3-2, the sequence instruction execution/monitor program of the second step is started, and the processing thereof is performed. The execution result is stored in the region of memory 4 corresponding to the second step in the same manner as the first step. This processing is repeated for every step of the sequence program, and the execution results corresponding to all the steps are stored in result memory 4 as shown in FIG. 3(B) when the processing of the final step is ended in step S3-4.

Thereafter, a determination is made whether or not a monitor request exists by referring, in step S3-5, to monitor request flag memory 6. If a monitor request flag exists, the operation is shifted to step S3-6 in which the contents of result memory 4 corresponding to the step number of the sequence program stored in monitor step memory 8 are displayed on the display section 9. If no monitor request flag is detected during the inquiry of step S3-5, and in any case after the processing of step S3-6 has been completed, the operation is returned to step S3-1, terminating one scanning and monitoring process of the sequence program.

Thus, in a conventional programmable controller, processing other than the execution processing of sequence instructions, that is, the processing for storing execution results into result memory 4 and the processing for stepping the contents of index memory 7, is performed regardless of the existence of a monitor request. Therefore, there is a disadvantage in that much time is consumed with this type of execution/monitor processing so that the sequence instruction execution speed and, hence, the sequence program execution speed become markedly lower. A conventional programmable controller has a further disadvantage in that result memory 4. for storing the execution results requires a number of regions corresponding to the number of steps of the sequence program, so that memory 4 must have a very large capacity. The resultant programmable controller is thus made unduly expensive in terms of the memory it consumes.

SUMMARY OF THE INVENTION

An object of the present invention is to eliminate the disadvantages of a conventional programmable controller of the type described above.

More specifically, an object of the present invention is to provide a programmable controller in which the execution speed of sequence instructions is increased and the required memory capacity is decreased in comparison to conventional programmable controllers.

To attain the above-mentioned objects, according to an aspect of the present invention, a programmable controller is provided which comprises: execution program storage means which stores a plurality of instruction execution programs for executing corresponding sequence instructions which are included in successive steps constituting a sequence program; execution result storage means in which at least one of the execution results of an executed sequence instruction can be stored; display means in which a stored execution result can be displayed; execution/monitor program storage means which stores a plurality of instruction execution/monitor programs corresponding to the instructions of the sequence program to control storage of the corresponding execution results of each sequence instruction into the execution result storage means; execution program address table storage means which stores a head address of at least some of the instruction execution programs to be started in accordance with the execution of successive steps constituting the sequence program; monitor instruction storage means which stores a flag indicating that the execution result of a sequence instruction included in a step constituting the sequence program is to be monitored; monitored step position storage means which stores the position in the sequence program of the step having a sequence instruction for which the execution result is to be monitored; detection means which detects whether or not a flag exists by referring to the monitor instruction storage means when the sequence program is executed; data insertion means which upon detection of a flag and in response to said position stored in said monitor position storage means, inserts in the execution program storage means, in place of the head address of the instruction execution program corresponding to the sequence instruction for which the execution result is to be monitored, the head address of the corresponding instruction execution/monitor program storage means; processing means which processes the sequence program in accordance with the contents of the execution program address table storage means after a data insertion operation has been performed by the data insertion means; and display control means which causes the display means to display the execution result stored in the execution result storage means after the processing has been performed by the processing means.

The above objects of the present invention will be apparent by reference to the following description in conjunction with the accompanying drawings.

DETAILED DESCRIPTION OF THE PREFERRED EMBODIMENT

Figure 1:
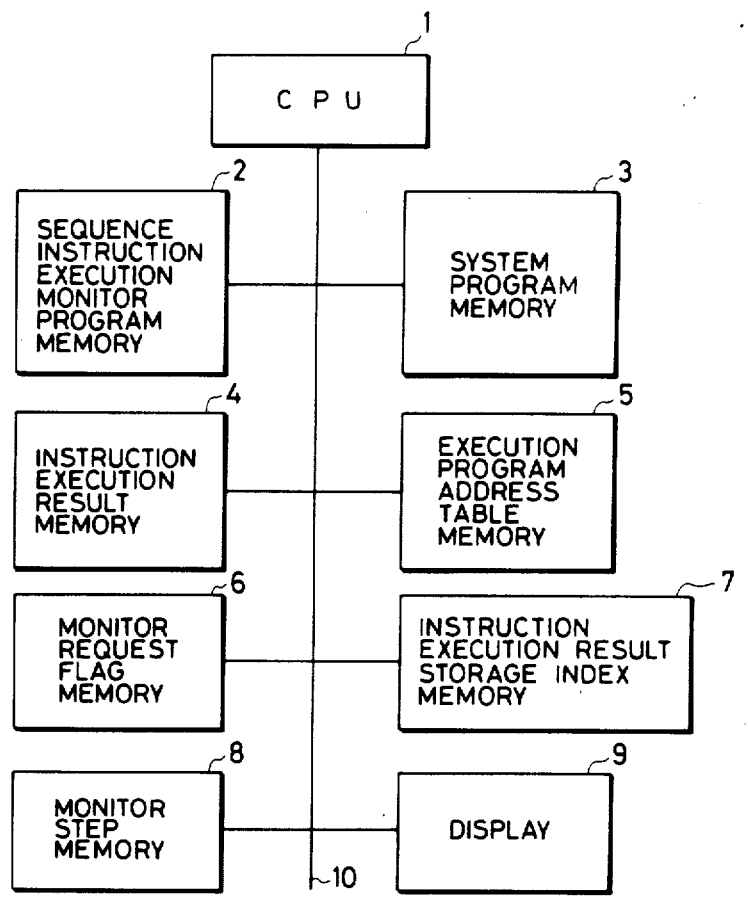
FIG. 1 is a block diagram showing a conventional programmable controller.
Figure 2:
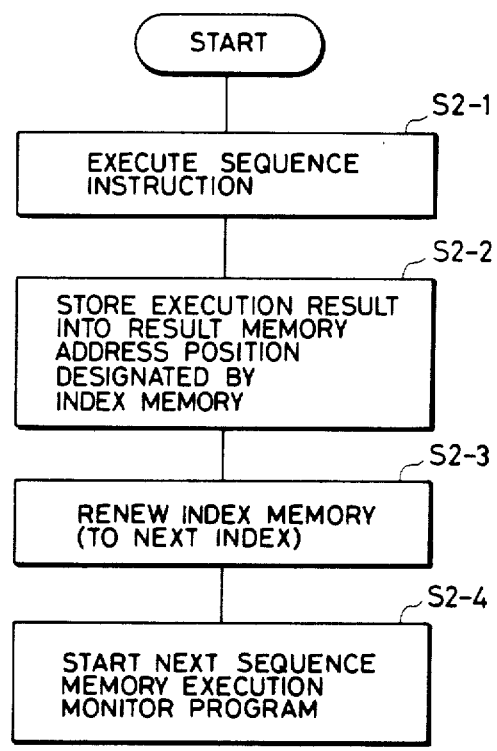
FIG. 2 is a flowchart illustrating the steps of a sequence instruction execution/monitor program of the conventional programmable controller of FIG. 1.
Figure 3:
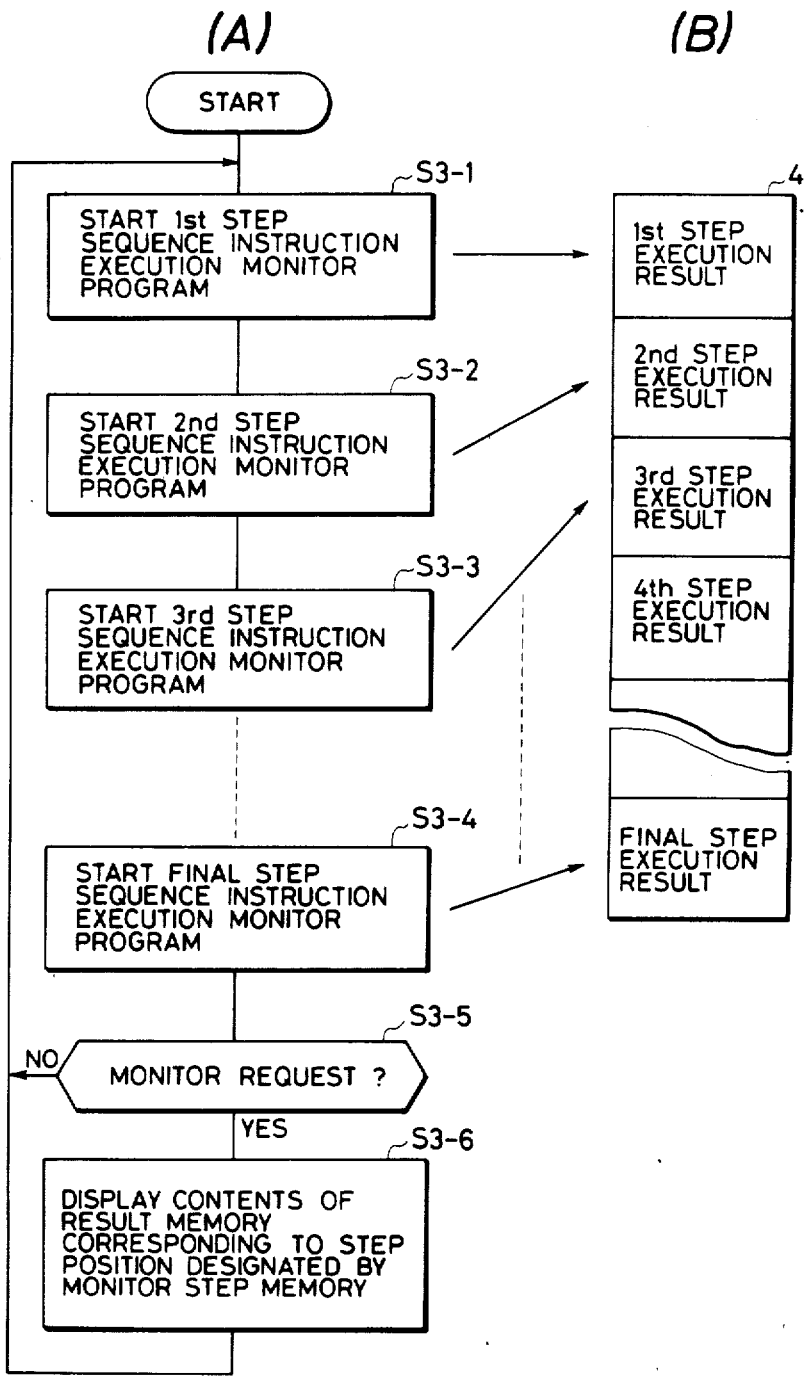
FIG. 3 is a diagram illustrating the processing of one scanning cycle of a sequence program in the conventional programmable controller of FIG. 1 and showing the contents of the result memory generated during that scanning cycle.

Referring to the drawings, the present invention will be described in detail hereunder.

Figure 4:
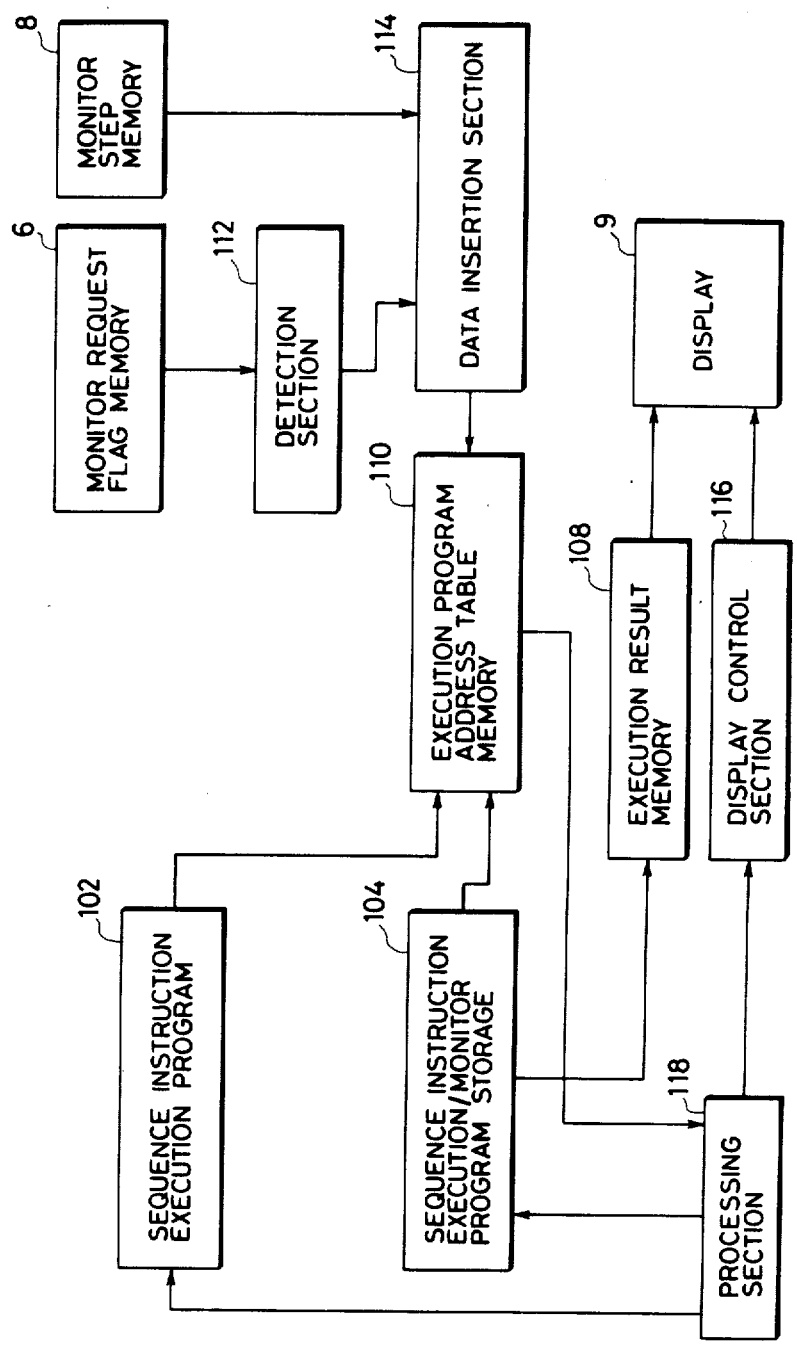
FIG. 4 is a block diagram showing a programmable controller according to the present invention.
Figure 5:
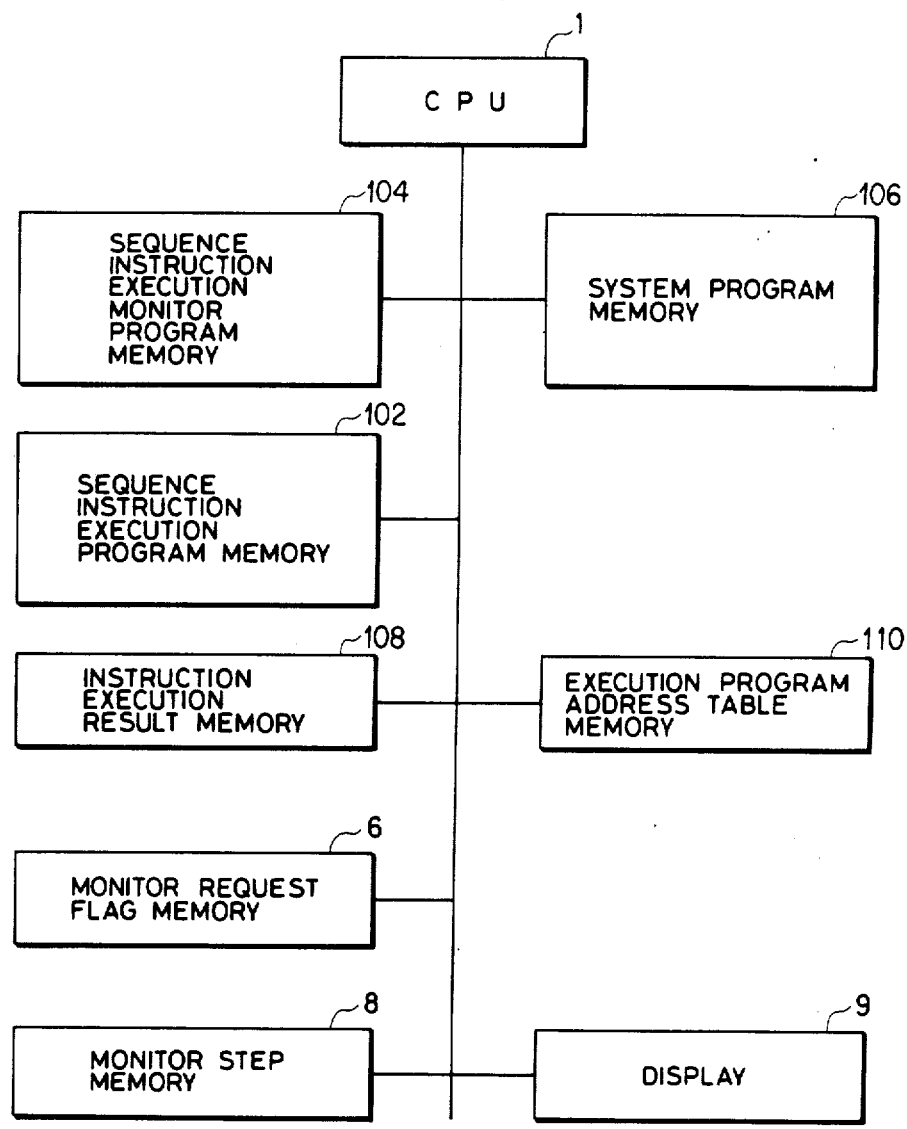
FIG. 5 is a block diagram showing an examplary arrangement of the memory of the programmable controller according to the present invention.

FIG. 4 shows an example of a system arrangement of a programmable controller according to the present invention. FIG. 5 shows the various memory sections and displays employed by the present invention. In FIGS. 4 and 5, parts similar to the conventional arrangement are denoted by the same reference numerals and the explanation therefor is omitted since the operation is as described above.

The programmable controller of FIGS. 4 and 5 includes a sequence instruction execution program memory 102, a sequence instruction execution monitor/program memory 104, a system program memory 106, an execution result memory 108, and an execution program address table memory 110. The sequence instruction execution program memory 102 stores a sequence instruction execution program for executing sequence instructions in the CPU 1. The sequence instruction execution program consists of only the processing procedure for executing a sequence instruction and the processing procedure for starting the next sequence instruction execution program after the first-mentioned processing, and does not affect the processing for storing the results of execution. The sequence instruction execution/monitor program memory 104 stores the sequence instruction execution/monitor program as shown in FIG. 7. The system program memory 106 stores a program for executing the processing procedure shown in FIG. 6. The execution program address table memory 110 stores the head addresses of the sequence instruction execution programs which are stored in the sequence instruction execution program memory 102. In FIG. 4, there is also shown a detection section 112, a data insertion section 114, a display control section 116 and a processing section 118, which all comprise operational aspects of CPU 1 of FIG. 5 under control of the system program stored in system program memory 106 of FIG. 5.

Figure 6:
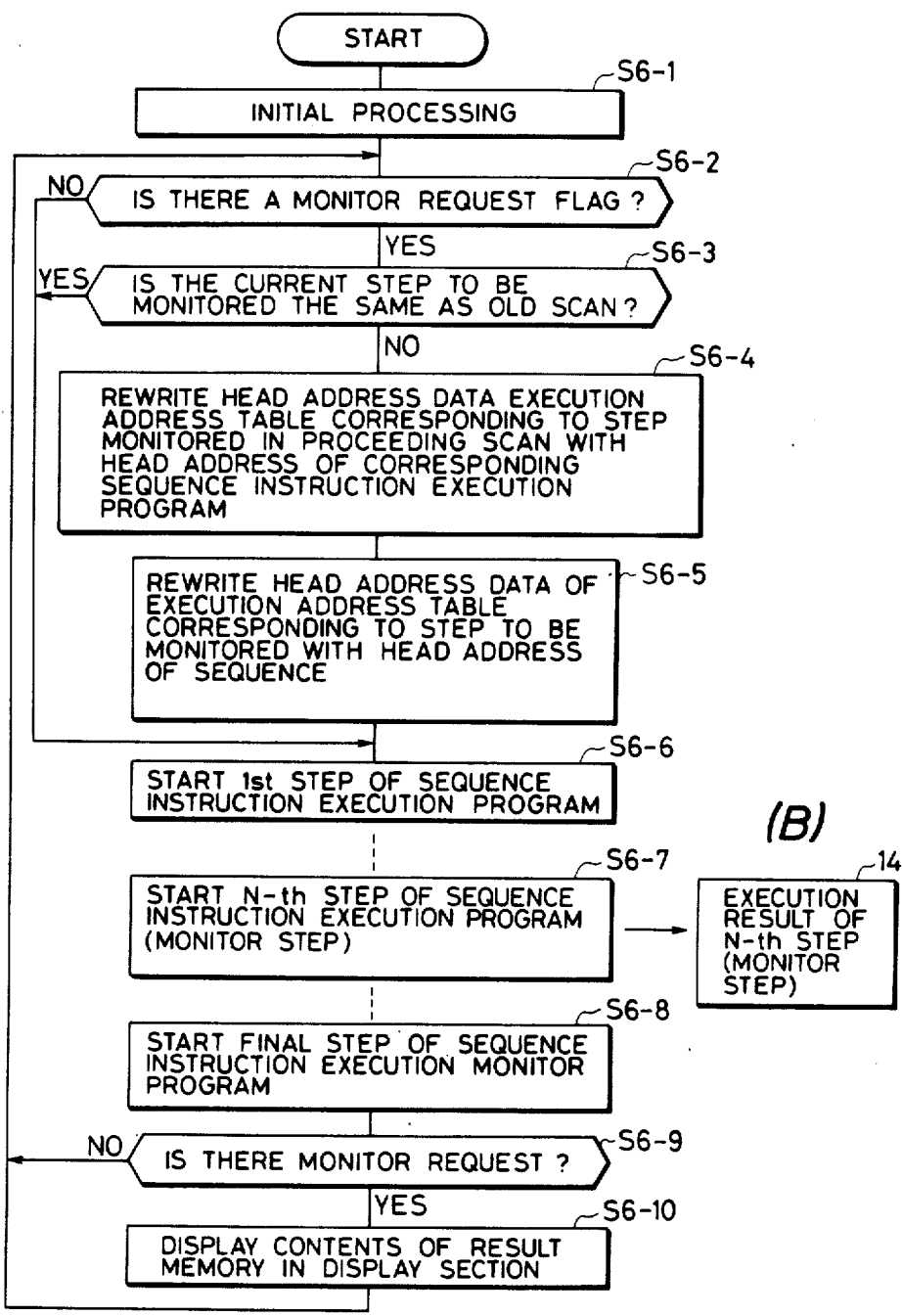
FIG. 6 is a diagram illustrating the processing procedure of an exemplary scanning cycle of the sequence program and the contents of a result memory generated thereby in accordance with the invention.
Figure 7:
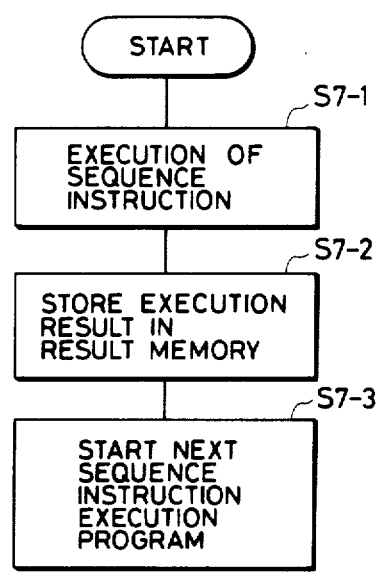
FIG. 7 is a flow chart showing an example of a sequence instruction execution/monitor program according to the present invention.

FIG. 6 shows the relation between an example of the processing procedure of one scanning of a sequence program in a programmable controller according to the present invention and the contents of the result memory of that controller. Initial processing is first performed in step S6-1. In step S6-2, the contents of monitor request flag memory 6 are examined to determine whether or not a monitor request flag exists. This operation is performed by detection section 112 of FIG. 4. If no monitor request flag is detected, the operation is shifted to step S6-6 in which the respective sequence instruction execution programs are started in the order they are listed in execution program address table memory 110. On the other hand, if a monitor request flag is detected, step S6-3 is executed by detection section 112 to determine whether or not the step to be monitored during the next scan is the same as that monitored during the preceding scan (hereinafter referred to as the "old monitor step"). If they are the same, then the operation jumps to step S6-6 because table memory 110 has been already rewritten into a state wherein monitor processing can be performed, and the respective sequence instruction execution programs are started as they are.

However, if the step to be monitored during the next scan is not the same as the old monitor step stored in monitor step memory 8, further processing is required. Specifically, the head address of the sequence instruction execution/monitor program, which had been set in the sequence instruction execution program address table corresponding to the old step, is replaced in step S6-4 through operation of data insertion section 114 by the head address of the sequence instruction execution program corresponding to the old step so as to prevent the execution results of the old step from being stored in result memory 108. Further, in step S6-5, the head address of the sequence instruction execution program, which has been set in the sequence instruction execution program address table corresponding to the step to be monitored, is replaced by the head address of the corresponding sequence instruction execution/monitor program, so that when the sequence instruction of the step to be monitored is executed, the execution result is stored in result memory 108. After the sequence instruction execution program address table is rewritten in this manner, in the next scan of the sequence program the execution result of the step to be monitored is stored in the result memory 108, and the operation is next shifted to step S6-6 to begin that scan.

In the processing of steps S6-6 to S6-8, a sequence program is started from the first step of that program, with reference to the contents of table 110, to execute the sequence instructions of that program. In this case, since all the head addresses stored in the sequence instruction execution program address table 110 corresponding to the sequence program steps other than the step to be monitored are the head addresses of the corresponding sequence instruction execution programs, the storage of the execution results of these programs into the result memory 108 is not performed. Accordingly, when these head addresses are accessed, the contents of memory 108 do not change. In the step of the sequence program to be monitored, that is, in the N-th step S6-7, since the corresponding head address stored in the sequence instruction execution program address table 110 is the head address of the sequence instruction execution/monitor program, the execution result for that program is stored in result memory 108.

Detection section 112 of FIG. 4 is once again used in step S6-9 after the sequence instruction of the final sequence program step has been executed in step S6-8 to determine if a monitor request flag exists. Since only the execution result for the monitored step has been stored in result memory 108, if a request flag exists, the contents of memory 108 are displayed through operation of display control 116 on display 9 in step S6-10. The operation is then returned to step S6-2, completing one scan of the sequence program.

The operation of each such scan is under the control of processing section 118 (FIG. 4) of CPU 1 (FIG. 5).

FIG. 7 shows an example of a sequence instruction-/execution monitor program according to the present invention. Upon starting this program, the processing for executing a sequence in struction is performed in step S7-1 and the result is then stored in result memory 108 in step S7-2. As to the position of this storage, the execution result can be stored in a certain fixed area in memory 108, because the execution result is stored only once in each scan of FIG. 6. Finally, in step S7-3, the next sequence instruction execution program is started and the processing of the previous program is ended.

As described above, according to the present invention, a programmable controller includes a first memory which stores a sequence instruction execution program for performing the processing needed to execute the sequence instructions of a sequence program, and a second memory which stores a corresponding sequence instruction execution/monitor program having the processing needed both to (1) execute the sequence instructions and (2) store the execution result in a result memory. The programmable controller determines the existence of a monitor request before executing a scan of the sequence program. Only in the case where a monitor request flag is detected is the sequence instruction execution/monitor program corresponding to the step to be monitored started; for all other steps of the sequence program, the corresponding sequence instruction execution programs are started. Therefore, only when the sequence instruction of the monitor request step is executed is the processing for writing the execution result into memory performed. When the sequence instruction of another step is executed, the processing for writing the execution result into the memory is not performed, permitting the sequence program to be completed at a high rate of speed. Further, the processing for storing the execution result into memory is performed only when the one step to be monitored of one scan is executed, so the capacity of the memory for storing the execution result need only store one result, permitting the programmable controller to be made at a low cost.

What is claimed is:

1. A programmable controller for executing a sequence program having sequential steps to produce corresponding execution results and for monitoring on a display the execution results of at least one of said steps, said programmable controller comprising:

execution program storage means for storing at addressable storage locations a plurality of instruction execution programs used in executing corresponding sequence instructions included in the sequential steps constituting the sequence program, each of said instruction execution programs commencing at an associated head address corresponding to an addressable storage location in said execution program storage means;

execution results storage means for storing at least one of the execution results of an executed sequence instruction;

execution/monitor program storage means for storing in corresponding sequences of addressasble storage locations a plurality of instructions execution/monitor programs used in executing corresponding sequence instructions included in said sequence program and in storing a corresponding execution result of each sequence instruction into said execution result storage means, each of said instruction execution/monitor programs having associated therewith a head address corresponding to an address in said corresponding sequence of addressable storage locations;

execution program address table storage means for storing said head addresses associated with at least some of said instruction execution programs to be executed in accordance with the steps of said sequence programs;

monitor instruction storage means for storing a flag used to indicate that the execution result of a sequence instruction is to be monitored;

monitored step position storage means for storing an index to indicate a step in said sequence program having a sequence instruction for which the corresponding execution result is to be monitored;

detection means for detecting whether said monitor flag exists by referring to said monitor instruction storage means when said sequence program is executed;

data insertion means, responsive to detection of said flag and to said index stored in said monitored step position storage means, for inserting in said execution program storage means, in place of the head address of sasid instruction execution program corresponding to the sequence instruction for which the execution result is to be monitored, the head address of the corresponding instruction execution/monitor program;

processing means for processing said sequence program in accordance with the contents of said execution program address table storage means after said insertion in said execution program storage means of said heat address of the corresponding instruction execution/monitor program has been performed by said data insertion means; and display control means for causing the display to display the execution results store in said execution results storage means after said processing of said sequence instruction for which the execution result is to be monitored has been procoessed by said processing means.

2. A method for executing in a programmable controller a sequence program having sequential steps to produce corresponding execution results and for monitoring on a display the execution results of at least one of said steps, said method comprising the steps of:

providing, at addressable storage locations, in an execution program storage, a plurality of instruction execution programs for executing corresponding sequence instructions included in the sequential steps constituting the sequence program, each of said instruction execution programs commencing at an associated head address corresponding to one of said addressable storage locations in said execution program storage means;

providing at addressable storage locations in an execution/monitor program storage, a plurality of instruction execution/monitor programs for executing corresponding sequence instructions included in said sequence program and for storing a corresponding execution result of each sequence instruction into an execution result storage, each of said instruction execution/monitor programs having associated therewith a head address corresponding to an address in said corresponding sequence of addressable storage locations;

storing, in an execution program address table storage, a list of the head addresses of at least some of said instruction execution programs to be executed in accordance with the steps of said sequence program;

storing a flag used to indicate that the execution result of a sequence instruction is to be monitored;

storing, in a monitored step position storage, an index to indicate a step in said sequence program having a sequence instruction for which the execution result is to be monitored;

detecting whether said monitoring flag exists by referring to said monitor instruction storage means when said sequence programed is executed;

inserting, responsive to detection of said flag and to said position stored in said monitor step position storage in said execution program storage in place of the head address of said instruction execution program corresponding to the sequence instruction for which the execution result is to be monitored, the head address of the corresponding instruction execution/monitor program;

processing said sequence program in accordance with the contents of said execution program address table storage after said step of inserting has been performed; and displaying the execution result stored in said execution result storage after said step of processing of said sequence instruction for which the execution result is to be monitored has been completed.

* * * * *

UNITED STATES PATENT AND TRADEMARK OFFICE
CERTIFICATE OF CORRECTION

PATENT NO. : 4,704,704
DATED : November 3, 1987
INVENTOR(S) : Yusho SATO, et al.

It is certified that error appears in the above-identified patent and that said Letters Patent is hereby corrected as shown below:

In Claim 1, Column 7, Line 7; change "addressasble" to --addressable--.

In Claim 1, Column 7, Line 39; change "sasid" to --said--.

In Claim 1, Column 7, Line 55; change "procoessed" to --processed--.

In Claim 2, Column 8, Line 39; change "programed" to --program--.

Signed and Sealed this

Twelfth Day of April, 1988

Attest:

DONALD J. QUIGG

*Attesting Officer*      *Commissioner of Patents and Trademarks*